US011556899B2

(12) United States Patent
Suenderhauf et al.

(10) Patent No.: US 11,556,899 B2
(45) Date of Patent: Jan. 17, 2023

(54) REPLICATION OF PLANNED WORKING TIME INFORMATION

(71) Applicant: SAP SE, Walldorf (DE)

(72) Inventors: Philipp Suenderhauf, Sandhausen (DE); Christiane Konstandin, Walldorf (DE); Jan Piechalski, Neckargemuend (DE); Jasmin Haas, Weyher (DE); Christoph Zakwieja, Heidelberg (DE); Stefan Gerard, Leimen (DE); Ralf Philipp, Altlussheim (DE); Wilko Dann, Ketsch (DE)

(73) Assignee: SAP SE, Walldorf (DE)

( * ) Notice: Subject to any disclaimer, the term of this patent is extended or adjusted under 35 U.S.C. 154(b) by 599 days.

(21) Appl. No.: 16/579,426

(22) Filed: Sep. 23, 2019

(65) Prior Publication Data
US 2021/0090028 A1    Mar. 25, 2021

(51) Int. Cl.
G06Q 10/10     (2012.01)
G06F 16/27     (2019.01)
G06F 16/23     (2019.01)
G06Q 10/06     (2012.01)

(52) U.S. Cl.
CPC ..... *G06Q 10/1091* (2013.01); *G06F 16/2379* (2019.01); *G06F 16/27* (2019.01); *G06Q 10/063116* (2013.01); *G06Q 10/105* (2013.01)

(58) Field of Classification Search
None
See application file for complete search history.

(56) References Cited

U.S. PATENT DOCUMENTS

| | | | | |
|---|---|---|---|---|
| 6,889,229 B1* | 5/2005 | Wong | ..................... | G06F 16/275 707/999.102 |
| 7,013,299 B1* | 3/2006 | Sherwood | ............. | G06F 16/219 |
| 10,650,021 B2* | 5/2020 | Elias | .................. | G06F 16/2308 |
| 2002/0165724 A1* | 11/2002 | Blankesteijn | ....... | G06F 16/2308 705/1.1 |
| 2004/0181426 A1* | 9/2004 | Rose | .................... | G06Q 30/012 705/28 |
| 2004/0254885 A1* | 12/2004 | Gernold | .................. | G06F 16/27 705/51 |
| 2004/0254937 A1* | 12/2004 | Gernold | ............... | G06Q 10/107 |
| 2006/0106825 A1* | 5/2006 | Cozzi | .................... | G06F 16/288 |
| 2011/0173294 A1* | 7/2011 | Jackson | .................. | H04L 12/14 709/217 |
| 2014/0279869 A1* | 9/2014 | Wu | ........................ | G06F 16/27 707/610 |
| 2019/0108269 A1* | 4/2019 | Suenderhauf | .......... | G06F 16/27 |

\* cited by examiner

*Primary Examiner* — Richard L Bowen
(74) *Attorney, Agent, or Firm* — Klarquist Sparkman, LLP

(57) ABSTRACT

Technologies are described for replicating selected changes to planned working time from a first system, such as an HR system, to a second system, such as a payroll system. For example, upon receiving an indication of a change to a planned working time for one or more workers on one or more days, the first system can evaluate the change to determine whether it should be replicated to the second system. The determination can be based on whether the change is a temporary change, as well as based on information read from a data replication configuration object, a data replication period object, and/or an in-sync work schedule object. Upon determining that the change should be replicated to the second system, a data replication proxy object can be created based on the change and used to transmit data regarding the change for replication at the second system.

20 Claims, 6 Drawing Sheets

REPLICATION OF PLANNED WORKING TIME INFORMATION

BACKGROUND

Organizations such as businesses, schools, charities, and governments often utilize computer software to perform functions related to human resources (HR) administration. This can include storing information on work schedules for workers (e.g., employees) of the organization, and utilizing the stored information when processing a payroll for the workers.

In some examples, organizations utilize separate HR and payroll systems, both of which require access to work schedule information to perform their associated functions. Accordingly, an organization utilizing such software may store the same work schedule information at both the HR system and the payroll system. As work schedule information is typically input via the HR system, maintaining the same information at the payroll system may require replication of the information from the HR system to the payroll system.

To ensure that up-to-date work schedule information is maintained at the payroll system, the software may be required to perform resource-intensive processes at regular intervals to replicate any work schedule changes from the HR system to the payroll system, including temporary work schedule changes, changes to holiday calendars, etc. For organizations with numerous workers, and/or organizations with numerous workers spanning different jurisdictions, the process of ensuring that consistent work schedule information is maintained at both the HR system and the payroll system can be especially costly and unwieldy.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for replicating selected changes to planned working time from a first system, such as an HR system configured to store and process core HR data as well as time-related data for worker scheduling/rostering, to a second system, such as a payroll system. For example, replicating selecting changes to planned working time can include receiving an indication of a change to a planned working time for one or more workers on one or more days. A data replication configuration object and a data replication period object can then be read, for example by a data replication controller of the first system. Based on information read from the data replication configuration object and the data replication period object, the first system can determine that the change should be replicated to the second system and create or update a data replication proxy object based on the change. One or more instances of a transient object associated with the data replication proxy object can then be created and transmitted to the second system, the instance(s) comprising information on the change. In some implementations, the determination of whether to replicate a given change is further based on reading an in-sync work schedule object storing a list of work schedules that are independently synchronized between the first and second systems and comparing the list to the work schedule(s) affected by the change.

DETAILED DESCRIPTION

Overview

The following description is directed to technologies for replicating selected changes to planned working time from a first system, such as an HR system, to a second system, such as a payroll system. For example, replicating selecting changes to planned working time can include receiving an indication of a change to a planned working time for one or more workers on one or more days. A data replication configuration object and a data replication period object can then be read, for example by a data replication controller of the first system. Based on information read from the data replication configuration object and the data replication period object, the first system can determine that the change should be replicated to the second system and create or update a data replication proxy object based on the change. One or more instances of a transient object associated with the data replication proxy object can then be created and transmitted to the second system, the instance(s) comprising information on the change. In some implementations, the determination of whether to replicate a given change is further based on reading an in-sync work schedule object storing a list of work schedules that are independently synchronized between the first and second systems and comparing the list to the work schedule(s) affected by the change.

Replication Environment

Figure 1:
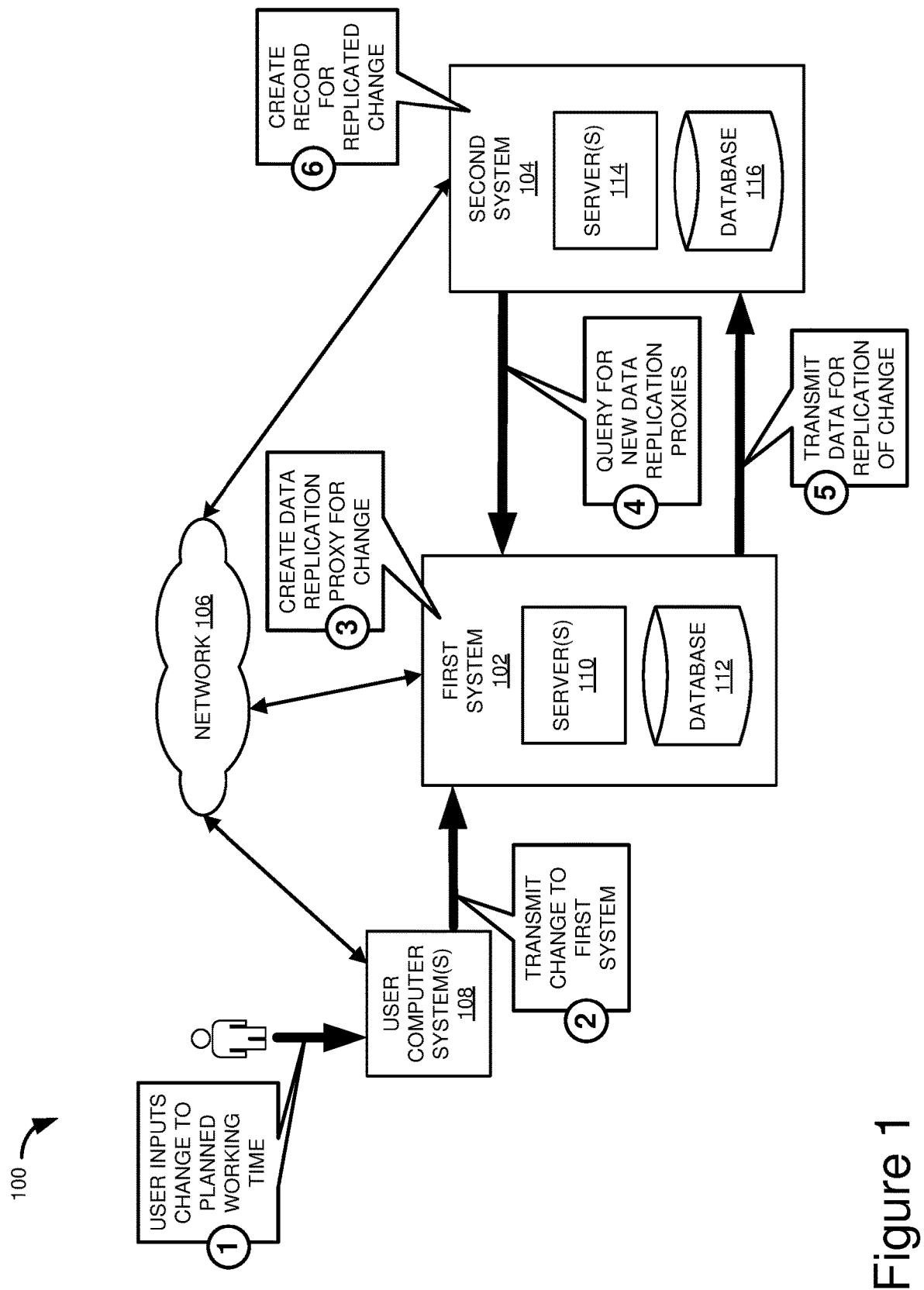
FIG. 1 is a diagram depicting an example replication environment for replication of data, including changes to planned working time, from a first system to a second system.

FIG. 1 is a diagram depicting an example replication environment 100. Replication environment 100 includes a first system 102 and a second system 104 that are connected via a network 106. In some examples, first system 102 is an HR system configured to store and process HR data including data associated with work schedules, and second system 104 is a payroll system. However, rather than being an HR system, first system 102 can alternatively be another type of system, such as a system concerned with scheduling or rostering. Similarly, rather than being a payroll system, second system 104 can alternatively be another type of system, such as a system configured to store and/or perform operations on data replicated from a scheduling or rostering system. First system 102 is adapted to replicate changes to planned working time, such as changes received via at one or more user computer systems 108 that are connected to the first system 102 via network 106. User computer system(s) 108 can include computing devices such as desktop computers, laptop computers, and mobile devices.

In the depicted example, first system 102 comprises one or more servers 110 and a database 112. Server(s) 110 can be adapted to perform various functions of first system 102, including replication of data to second system 104, e.g. through software running on one or more processors. Database 112 can store information relevant to HR administration, including information relevant to work schedules of workers (e.g., employees) of an organization utilizing the first system 102. For example, database 112 can store information input by workers or HR administrators via user computer system(s) 108, such as normal work schedules specifying how many hours the worker will work each day of the week, and changes to planned working time (e.g., transient/temporary changes to how many hours the worker will work on one or more days during a specified time period, changes to planned working time related to a holiday calendar, etc.). Database 112 can optionally also store additional information on workers such as, for example, name, address, salary, bonuses, and bank account details. In other examples, this additional information can be stored in another database accessible to workers and/or HR administrators via network 106.

Similarly, in the depicted example, second system 104 comprises one or more servers 114 and a database 116. Server(s) 114 can be adapted to perform various actions associated with second system 104, for example through software running on one or more processors thereof. These actions can include storing, processing, and outputting paystub information and financial reporting information. In the context of storing and processing paystub information, the second system 104 can query the first system 102 to obtain data on changes to planned working time, and thereby initiate replication of any new changes to planned working time from the first system 102 to the second system 104. Upon receipt of the replicated data, the second system 104 can then generate records based on the data. In some examples, the generated records are stored in particular data formats referred to as "infotypes," with data of different categories being stored in different infotypes. The generated records can optionally be stored in database 116. The data stored in the database 116 may be output to other components and/or systems for the generation of paystubs and financial statements.

An overview of exemplary actions that can be performed in the replication environment over a period of time are indicated by the circled numbers 1-6 in FIG. 1. In particular, the circled numbers are used to depict stages of a sequence in which the actions occur. The various actions are discussed in further detail below with reference to FIG. 2. While the stages are described in a particular sequential order for discussion, it should be understood that stages can be combined, stages can be omitted, the order of stages can be changed, and/or new stages may be present depending on the specific implementation.

At stage 1, a user inputs a change to planned working time via user computer system(s) 108. The user can be the worker whose planned working time is changing, or alternatively, another person such as an HR administrator who was made aware of the change. In one illustrative example, the change is a temporary change to the planned working time of a worker whose normal work schedule is as follows: Monday: 8 h; Tuesday: 8 h; Wednesday: 8 h; Thursday: 8 h; Friday: 8 h; Saturday: 0 h; Sunday: 0 h. This normal work schedule has the identifier "NORM" in the first system 102. The temporary change applies only to the month of June in the year 2017, and has the identifier "HALF" (to distinguish it from the normal work schedule "NORM"). During June 2017, the work schedule of the worker deviates from their normal work schedule as follows: Monday: 4 h; Tuesday: 5 h; Wednesday: 3 h; Thursday: 3 h; Friday: 5 h; Saturday: 0 h; Sunday: 0 h. In another illustrative example, the normal work schedule for a worker may change for some reason, triggering a user to input the new normal work schedule to the first system 102 via the user computer system. In yet another illustrative example, the change is a change to a holiday calendar, e.g., for a specific country, such as implementation of a new holiday calendar for a new year or a change to an already-implemented holiday calendar. The change to the holiday calendar can be input by an HR administrator, as opposed to be an individual worker, and can affect the work schedules of workers within a jurisdiction (e.g., country) affected by the holiday calendar. For example, for workers in Germany, a new German holiday calendar added for 2017 can specify several dates in 2017 for which the planned working time for all workers in Germany should be changed to 0 h. Or, after the holiday calendar for a given year in a given jurisdiction has been implemented, a change to the holiday calendar may be appropriate in some circumstances (e.g., when the jurisdiction has added a new holiday or modified the date of a holiday after the year has already begun).

In any case, at stage 2, the change to the planned working time input at stage 1 is transmitted from the user computer system to first system 102 via network 106. Then, at stage 3, first system 102 can create a data replication proxy (e.g., a data replication proxy object) for the change. As discussed further below with respect to FIG. 2, this may only occur when certain conditions are met, such as when the change affects at least one date within a current data replication period.

At stage 4, the second system 104 queries the first system 102 for any new data replication proxies. In other examples, however, first system 102 can instead push data replication proxies to second system 104 (e.g., first system 102 can initiate replication without receiving any queries from second system 104 requesting replication). In such examples, the pushing of data replication proxies can be prompted by creation or updating of one or more data replication proxies, or alternatively, first system 102 can push data replication proxies to second system 104 on a scheduled basis (e.g., every 5, 10, or 15 minutes, or at other intervals).

At stage 5, the first system 102 transmits data for replication of the change to the planned working system to the second system 104. As discussed further below with reference to FIG. 2, further actions may be performed after receiving the query and prior to transmitting the data. For example, further evaluation of the change may be performed to determine whether to replicate the change, such as comparing a list of in-sync work schedules to the work schedule(s) affected by the change. Further, prior to transmitting the data to second system 104, a transient object can read information stored in one or more data structures (e.g., objects) associated with the change. For example, the transient object can provide a view and projection of the original data structure(s) associated with the change for the purpose of replication. That information read from the data structure(s) associated with the change can then be used to populate instances of the transient object, which in turn can be transmitted to second system 104 to replicate the change.

Put another way, responsive to detection of a relevant change in the first system, a data replication proxy can be stored at stage 3. When the second system subsequently queries the data at stage 4, a navigation from the data replication proxy to the transient object is performed in the first system to collect all the relevant data to be transmitted for replication at stage 5.

At stage 6, the second system 104 creates a record for the replicated change. The created record can optionally be stored in a database of the second system 104 (e.g., database 116). The record can subsequently be referenced by the second system 104, e.g. during processing of paystub information in examples where second system 104 is a payroll system.

While creation of a single record is discussed, where a single record applies to a single worker on a single day (date), there are some examples where a given data replication proxy will ultimately result in creation of more than one records at second system 104, e.g., when the change applies to the planned working time of multiple workers rather than a single worker. For example, when a new holiday calendar is added, or when an existing holiday calendar is changed, the planned working time of a large number of workers can change, and thus a correspondingly large number of records can be created at second system 104.

Replication Process

Figure 2:
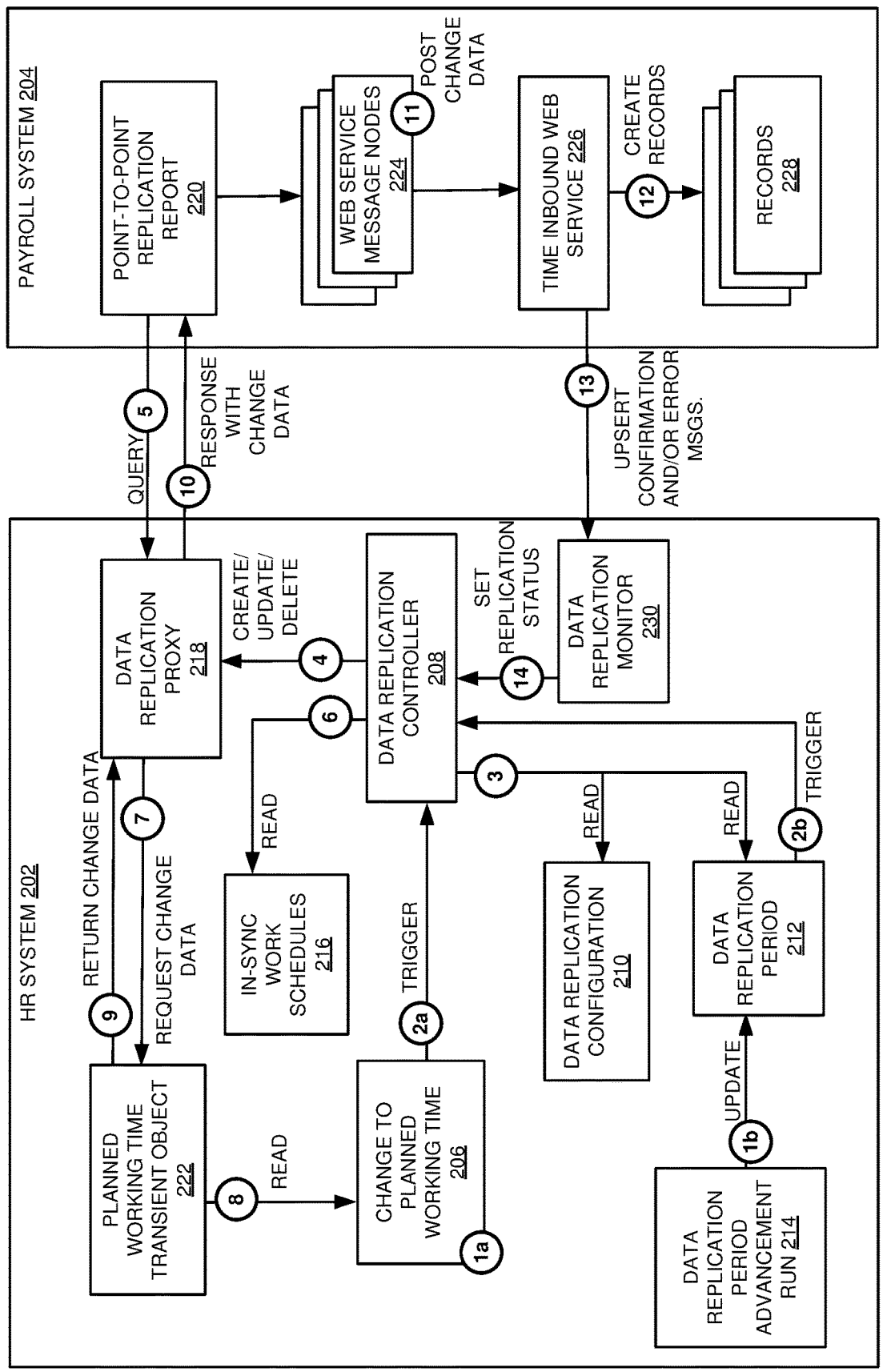
FIG. 2 is a diagram depicting interactions between an HR system and a payroll system during replication of changes to planned working time.

FIG. 2 depicts a diagram 200 of detailed interactions between an HR system 202 and a payroll system 204 during replication of changes to planned working time. As in FIG. 1, circled numbers are used to depict stages of a sequence in which various actions occur. HR system 202 and payroll system 204 can correspond to first system 102 and second system 104 of FIG. 1, for example. While the stages are described in a particular sequential order for discussion, it should be understood that stages can be combined, stages can be omitted, the order of stages can be changed, and/or new stages may be present depending on the specific implementation.

At stage 1a, the HR system 202 receives a change to planned working time 206, e.g. via user input to a user computer system as discussed above for stage 1 of FIG. 1. At stage 2a, the change 206 triggers a data replication controller 208 of the HR system 202 to evaluate the change. Towards this end, at stage 3, the data replication controller reads a data replication configuration 210 (e.g., stored in a data replication configuration object) and a data replication period 212 (e.g., stored in a data replication period object). The data replication configuration 210 can include information such as whether changes to planned working time should be replicated at all, and if the changes should be replicated, which date should be the starting date for changes to be replicated. In addition, filter criteria can be entered in master data information of worker (e.g., employee) stored in the HR system, to reduce the number of employees affected by the change.

Reading the data replication period 212 can include determining a current data replication period, e.g., determining a start date and end date of a time period that is currently of interest to the payroll system 204. For example, on a given date, the payroll system 204 may be processing a payroll for a certain time period (e.g., a three-month time period), and the data replication period can match this time period. After reading the data replication period, the data replication controller can compare the date(s) affected by the change to the planned working time to the data replication period to determine whether any of the date(s) affected by the change to the planned working time fall within the data replication period.

Upon determining that none of the date(s) affected by the change to the planned working time fall within the data replication period, the data replication controller can refrain from taking further actions towards replicating the change until the data replication period shifts to a new data replication period that does include at least one date affected by the change. The shifting of the data replication period can be performed by a data replication period advancement run 214 at stage 1b. Data replication period advancement run 214 can be a mechanism for shifting the data replication period into the future. In one illustrative example, the data replication period advancement run can be performed two months into a current quarter to extend the data replication period to the end of next quarter (e.g., on March $1^{st}$ calculate to June 30th, on June 1st calculate to September 30th, on September 1st calculate to December $31^{st}$, on December 1st calculate to March 31st, etc.) The new end date determined by the data replication advancement run can then be stored in data replication period 212.

The data replication period advancement run can be performed automatically by the HR system, or initiated by a user such as an HR administrator, to update the data replication period to a new data replication period. The updating of the data replication period can trigger the data replication controller at stage 2b. For example, responsive to being triggered by an update to the data replication period, the data replication controller can proceed with replication of previously input changes that apply to the updated data replication period.

After stage 3, if the data replication controller has determined that the change affects at least one day within the current data replication period, and if the information read in the data replication configuration confirms that the change should be replicated, the data replication controller proceeds to stage 4 to create or update a data replication proxy 218 for the change. For example, data replication proxies are deleted after a successful replication, and then new data replication proxies are created for subsequent changes. However, updating of a data replication proxy may be appropriate in circumstances where a new change occurs in the HR system 202 before a replication process for a prior related change has completed. In this situation, as the data replication proxy for the prior related change has not yet been deleted, it can instead be updated for the new change.

Data replication proxy 218 can be an object configured to store information (e.g., in the form of field-value pairs) relevant to replication of data. The data replication proxy can be conceptualized as a "placeholder," in that its existence indicates (e.g., to the payroll system 204) that there is new information to be replicated. The data replication proxy can reference and/or be associated with a planned working time transient object 222, which is described further below. For example, the data replication proxy can store pointers to objects such as the planned working time transient object 222. Further, the data replication proxy can have a status such as "out-of-sync," indicating that the associated change(s) have not yet been replicated to the second system, or "deleted." The "deleted" status may be appropriate when a deletion of formerly replicated data is necessary.

In addition to storing pointers to other objects, the data replication proxy can store values of one or more fields, including but not limited to fields set forth in Table 1 below. As indicated, each field can be associated with a Metadata Framework (MDF) type and/or source. These fields can include a "plannedWorkingTimeStart" field and a "plannedWorkingTimeEnd" field, both having the MDF type "date" When the data replication proxy is created or updated, the value of the "plannedWorkingTimeStart" field can be populated, such as by the data replication controller, with a value corresponding to the date on which the change to the planned working time begins (e.g., the first calendar date on which the work hours are changed relative to the normal work schedule of the worker(s) in question). Similarly, the value of the "plannedWorkingTimeEnd" field can be populated, such as by the data replication controller, with a value corresponding to the date on which the change to the planned working time ends (e.g., the last calendar date on which the work hours are changed relative to the normal work schedule of the worker(s) in question).

TABLE 1

| Field | MDF Type | MDF Source |
|---|---|---|
| externalCode | AutoNumber | |
| replicationContentType | Enum | Java Enum "ReplicationContentType" |
| replicationScenarioObject | Enum | Java Enum "ReplicationScenarioObject" |
| employeeTime | Generic Object | Employee Time |
| employeeTimeValuationResult | Generic Object | Employee Time Valuation Result |
| timeAccountSnapshot | Generic Object | Time Account Snapshot |
| sourceGenericObjectInternalId | String | |
| timeAccount | Generic Object | Time Account |
| employeeTimeWithAccountDetail | Generic Object | Employee Time |
| timeAccountPayout | Generic Object | Time Account Payout |
| plannedWorkingTimeStart | Date | |
| plannedWorkingTimeEnd | Date | |

In addition to the fields shown in Table 1, the data replication proxy can also store information specifying one or more target systems for replication. For example, the payroll system 204 can be specified as a target system for replication of the change associated with the data replication proxy.

While a single data replication proxy 218 is shown in FIG. 2, multiple data replication proxies can be present in the HR system 202 at any given time, e.g. in the form of a queue. For example, a list of data replication proxies may be stored "on the cloud," e.g., in a network location accessible to both the HR system 202 and the payroll system 204.

Continuing to stage 5, the payroll system 204 queries the HR system 202 for any new data replication proxies. In particular, as shown, the payroll system 204 includes a point-to-point (PTP) replication report 220. PTP replication report 220 can produce the queries, e.g. using a pull-based model in which the PTP replication report polls a queue of data replication proxy objects. For example, the PTP replication report can periodically poll the HR system 202 for new changes to replicate by periodically sending queries (e.g., every 5, 10, or 15 minutes, or at other user-definable intervals). In some examples, however, transmission of the queries can occur on an interrupt basis; for example, creation or updating of a data replication proxy at the HR system 202 can generate an interrupt which triggers the HR system 202 to alert the payroll system 204 of a new data replication proxies. In other examples, transmission of a query does not occur at all; instead, the HR system 202 takes the initiative in ensuring that changes meeting the various criteria described herein are transmitted to the payroll system 204 for replication. Alternatively, in examples where a list of data replication proxies is stored on the cloud, the payroll system 204 can intermittently check the list, and/or receive alerts from the cloud when the list is updated.

Upon receipt of a query, the HR system 202 proceeds to formulate a response in the manner described below. This can begin at stage 6. At stage 6, after receipt of the query, the data replication controller reads a list of in-sync work schedules 216 (e.g., an in-sync work schedule object storing such a list) to determine whether the data replication proxy affects any work schedules that are not included in the list. The list of in-sync work schedules can be a list of work schedules that are synchronized with the payroll system 204, independent of the data replication processes discussed herein. Due to this synchronization, it may not be necessary to replicate changes to work schedules in the list of in-sync work schedules, with the exception of temporary changes which may not be included in the synchronization. For example, the synchronization may only apply to certain normal work schedules and holiday calendars. Accordingly, the reading of the list of in-sync work schedules may only be performed for changes that are not temporary changes to planned working time, as it may be appropriate to replicate temporary changes to work schedules of workers regardless of whether the workers' normal work schedules are synchronized with the payroll system 204.

Accordingly, when the change is not a temporary change, the data replication controller can compare the work schedule(s) affected by the change to the work schedules read from the in-sync work schedule list, to determine whether any affected work schedules are not included in the list. If the change pertains to at least one work schedule which is not included in the list, the data replication controller can proceed to create a data replication proxy 218 for use in replicating the change (in particular, for use in replicating the change for those work schedules that are not included in the list). However, if all work schedules affected by the change are included in the list, the data replication controller can abort the replication process for that change, as the change will instead be propagated to the payroll system 204 via the independent synchronization. The data replication controller can abort the replication process by deleting data replication proxy 218, for example.

If the data replication proxy has not been deleted at stage 6, the replication proceeds to stage 7. At stage 7, data on the change to the planned working time is requested from planned working time transient object 222. The requesting can be performed by data replication controller 208 based on information stored in data replication proxy 218, for example, and in response to the query received at stage 5. Upon receipt of the request, at stage 8, the planned working time transient object reads the change 206, which can take the form of a data object. The information read from change 206 is then be returned to the data replication proxy at stage 9. In some examples, the returned change data comprises one or more instances of the planned working time transient object. In some implementations, stage 6 and stage 7 are combined into a single stage.

At stage 10, a response including the data regarding the change is sent to the payroll system 204, in particular to PTP replication report 220. The response can take the form of a JavaScript Object Notation (JSON) structure, for example. At stage 11, the PTP replication report posts the change data to a time inbound web service 224. For example, the PTP replication report can convert the response received at stage 10 into an eXtensible Markup Language (XML) data structure and post it in the inbound queue of a time inbound web service 226.

The time inbound web service 226 can then use the incoming data to create records 228 at stage 12. The records can be stored in a database of the payroll system 204, such as database 116. The records can be stored in particular data formats referred to as "infotypes." For example, changes to planned working time may be converted into records of infotype 2003.

Next, at stage 13, time inbound web service 226 transmits information to a data replication monitor 230 of the HR system, the information indicating whether the replication was successful. Data replication monitor 230 can be a module of the HR system 202 configured to provide status information for the replication to the data replication controller. As shown, the information can include "upsert" confirmation message and/or error messages. An "upsert" confirmation can refer to a message confirming that records corresponding to the replicated changes were successfully updated or inserted at the payroll system 204. In contrast, error messages can be transmitted when one or more records corresponding to the changes to be replicated were not successfully updated or inserted at the payroll system 204.

At stage 14, the replication status of the data replication proxy is set (e.g., changed or maintained). For example, the data replication monitor can communicate the outcome of the replication to the data replication controller. Upon receiving an indication that the replication was not successful, the data replication controller can maintain the status of the data replication proxy as "out-of-sync" or "deleted." Otherwise, if the replication was successful, the data replication controller can delete the data replication proxy, rather than set its status.

Methods for Selectively Replicating Changes to Planned Working Time

In the technologies described herein, methods can be provided for selectively replicating changes to planned working time. For example, a controller of a first system (e.g., a data replication controller of an HR system such as data replication controller 208 of HR system 202 of FIG. 2) can read from various objects, and use the data to determine whether a given change to the planned working time should be replicated to a second system (e.g., a payroll system such as payroll system 204 of FIG. 2). In some implementations, only those changes meeting certain predefined criteria is selected for replication. These criteria can include, for example, whether the change affects at least one date that falls within a current data replication period, whether the change is a temporary change or another type of change to planned working time, whether the change affects a work schedule included in a list of in-sync work schedules that is synchronized with the second system using a separate process that is independent of the replication process, etc.

Figure 3:
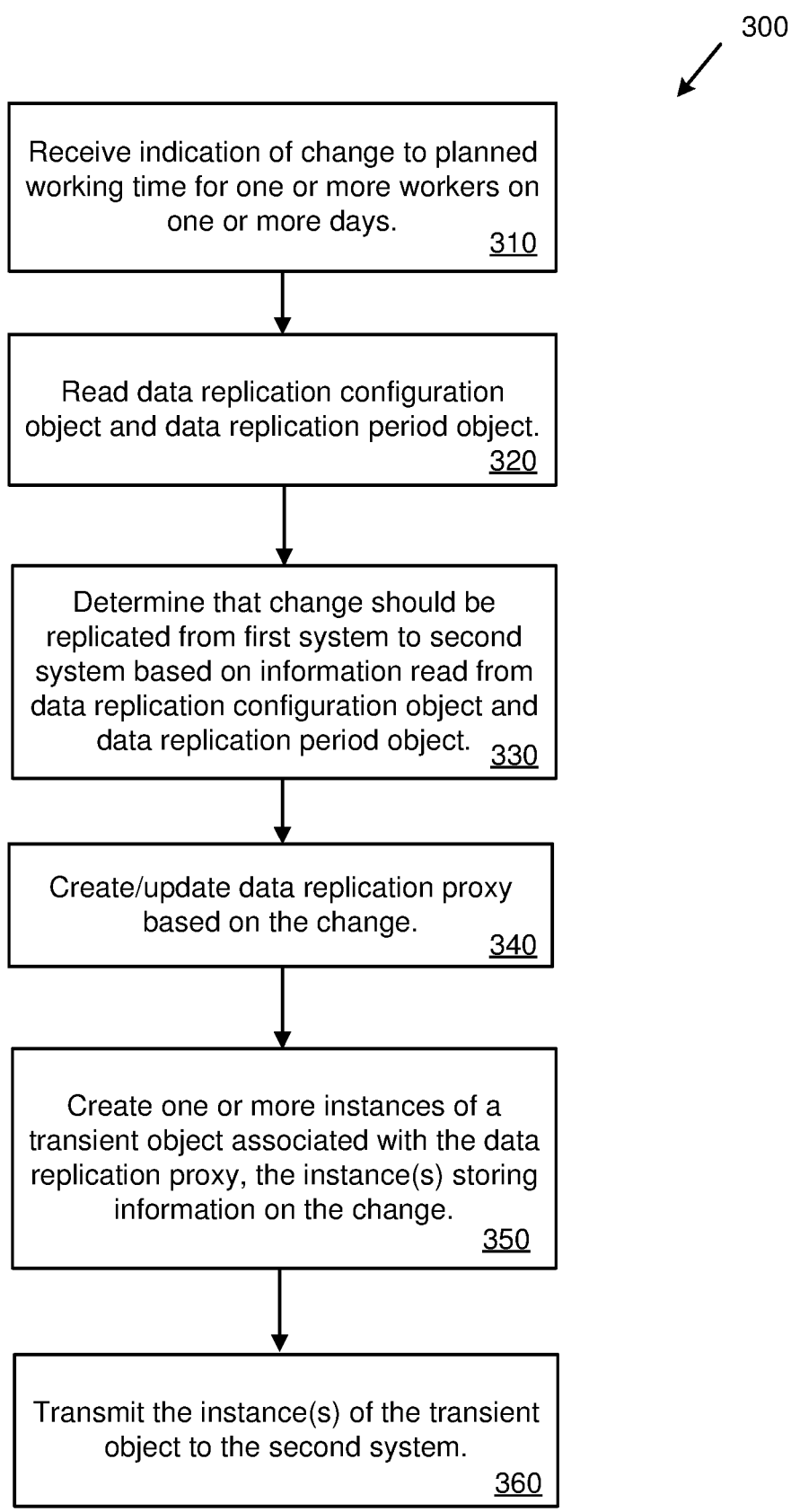
FIG. 3 is a flowchart of an example method for selectively replicating changes to planned working time from a first system to a second system.

FIG. 3 is a flowchart of an example method 300 for selectively replicating changes to planned working time from a first system to a second system. The example method 300 can be performed by one or more computing devices. For example, the example method 300 can be performed by one or more computing devices of a first system (e.g., HR system 202 of FIG. 2) configured to replicate selected changes to planned working time, e.g., selected changes input to the first system by one or more user computer systems, to a second system (e.g., payroll system 204 of FIG. 2).

At 310, an indication of a change to the planned working time for one or more workers on one or more days is received. For example, as discussed above with reference to stage 1 of FIG. 1, a user of the first system (e.g., a worker or HR administrator) can input the change via a user computer system (e.g., a laptop, desktop, or mobile computing device) that runs an instance of or otherwise communicates with the first system.

At 320, a data replication configuration object and a data replication period object are read. For example, as discussed above with reference to stage 3 of FIG. 2, a data replication controller of the first system can read information stored in the data replication configuration object and data replication period object.

At 330, it is determined that the change should be replicated from the first system to second system based on information read from data replication configuration object and data replication period object. The determination can be performed by a data replication controller of the first system. For example, the data replication controller can evaluate the information read from these objects to determine whether the change should be replicated. As discussed further below with reference to FIG. 4, this can include determining that the change applies to at least one date within a current data replication period stored in the data replication period object, and/or determining that the change should be replicated based on the information stored in the data replication configuration object.

At 340, a data replication proxy is created or updated based on the change. For example, as discussed above with reference to stage 4 of FIG. 2, the data replication controller of the first system can create a data replication proxy object that contains pointers to one or more other objects, such as a planned working time transient object, and further contains fields such as fields indicating start and end dates of the change on which the data replication proxy is based.

At 350, one or more instances of a transient object associated with the data replication proxy are invoked, the instance(s) comprising information on the change. For example, an object in the HR system that was generated when the change was input can include data regarding the change, and the instance(s) of the transient object can be populated with data read from the object associated with the change. The transient objects can reside in memory only during a single session, as opposed to non-transient objects which could be persisted or available to another transaction.

At 360, the instance(s) of the transient object invoked at 350 are transmitted from the first system to the second system. For example, as discussed above with regard to stage 10 of FIG. 2, a response including data on the change (e.g., in the form of instance(s) of the planned working time transient object) can be sent to a second system (e.g., to a PTP replication report module of a payroll system).

Figure 4:
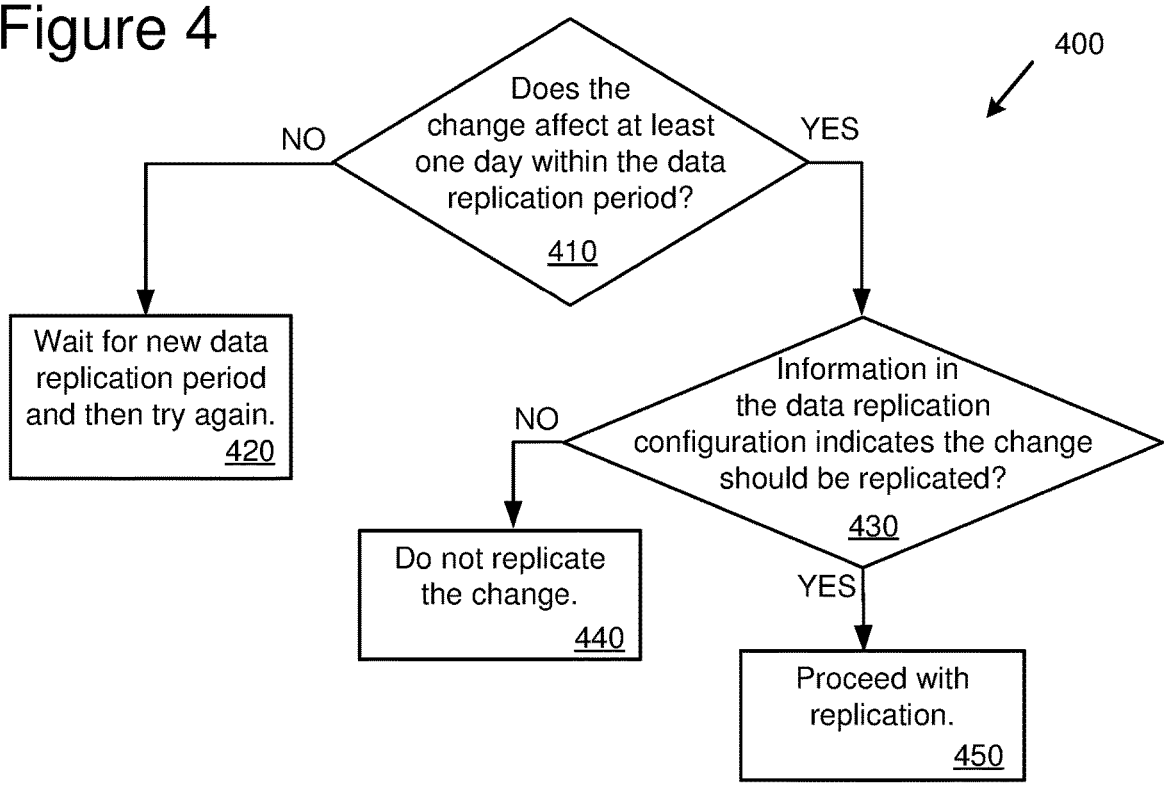
FIG. 4 is a flowchart of an example method for determining whether to replicate a given change to planned working time based on a data replication period and a data replication configuration.

FIG. 4 is a flowchart of an example method 400 for determining whether to replicate a given change to the planned working time of one or more workers on one or more days based on a data replication period and a data replication configuration. Method 400 can be performed by one or more computing devices. For example, method 400 can be performed by a data replication controller of a first system (e.g., HR system 202 of FIG. 2). In some examples, method 400 is performed at process block 330 of FIG. 3.

At 410, it is determined whether the change to the planned working time affects at least one day within the data replication period. For example, this can include the data replication controller comparing dates specified in a data replication period object, which define the data replication period, to the dates affected by the change.

If the answer at 410 is NO, the method proceeds to 420 and the data replication controller waits for a new data replication period and then tries again. For example, as discussed above with reference to FIG. 2 at stage 1b, the data replication period may be periodically updated via a data replication period advancement run. Accordingly, the data replication controller can wait until the data replication period has been updated, and then return to 410 to determine whether the change affects at least one day within the updated data replication period.

Otherwise, if the answer at 410 is YES, the method proceeds to 430 and it is determined whether the information in the data replication configuration indicates that the change should be replicated. If the answer at 430 is NO, the method proceeds to 440 and the change is not replicated. For example, the replication process for the change can be aborted by the data replication controller. Otherwise, if the answer at 430 is YES, the method proceeds to 450 and the data replication controller proceeds with replication. Proceeding with replication can include performing the actions described above with reference to stages 4-14 of FIG. 2, for example.

Figure 5:
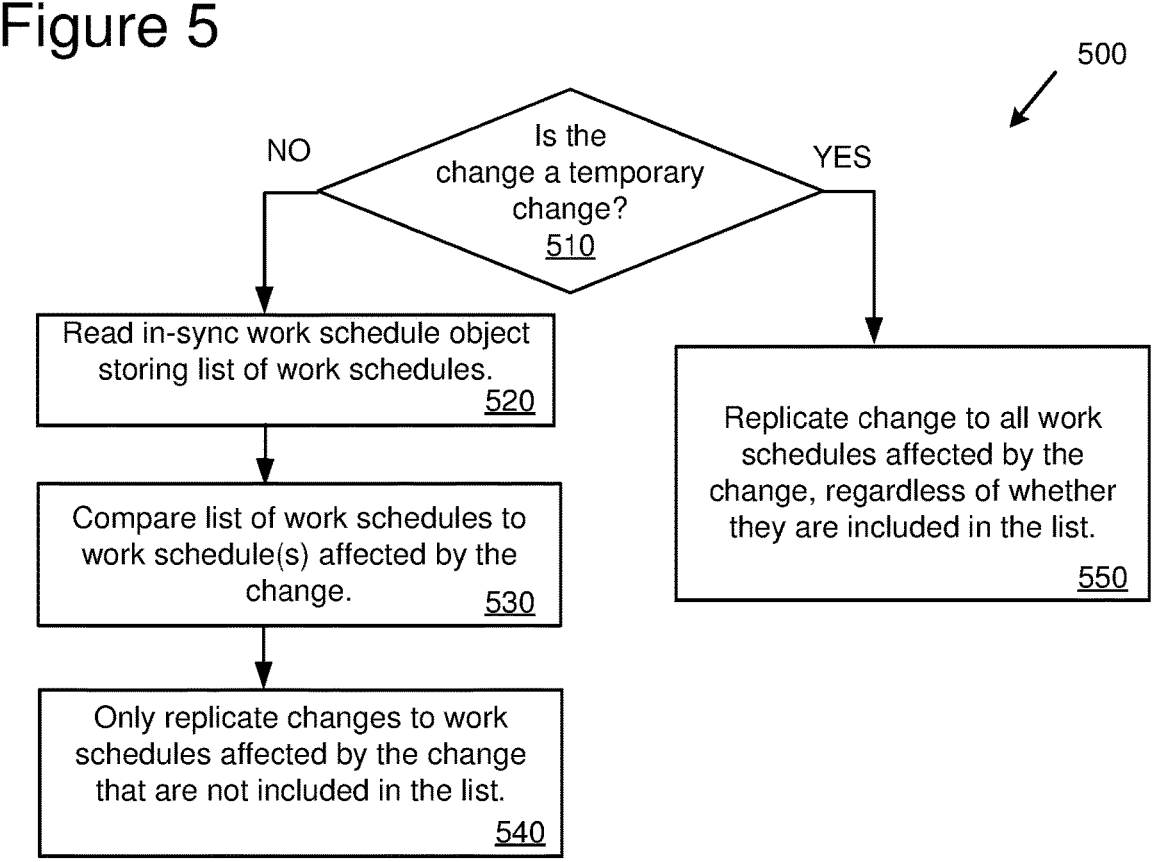
FIG. 5 is a flowchart of an example method for determining whether to replicate a given change to planned working time based on whether the change is a temporary change and whether the work schedule(s) affected by the change are included in a list of in-sync work schedules.

FIG. 5 is a flowchart of an example method 500 for determining whether to replicate a given change to the planned working time of one or more workers on one or more days based on whether the change is a temporary change and whether the work schedule(s) affected by the change are included in a list of in-sync work schedules. Method 500 can be performed by one or more computing devices. For example, method 500 can be performed by a data replication controller of a first system (e.g., HR system 202 of FIG. 2). Method 500 can be performed either before or after creation of a data replication proxy object. For example, method 500 can be performed between process blocks 330 and 340 of method 300 of FIG. 3, or between process blocks 340 and 350 of method 300. Additionally or alternatively, method 500 can be performed either before or after example method 400 of FIG. 4.

At 510, it is determined whether the change to the planned working time is a temporary change. For example, the change may be embodied as an object comprising information such as date(s) affected by the change, work schedule(s) affected by the change, and the type of change (e.g., temporary change, non-temporary change to assigned work schedule, change to holiday schedule, etc.).

If the answer at 510 is NO, the method proceeds to 520 and an in-sync work schedule object is read. The in-sync work schedule object can correspond to in-sync work schedules 216 of FIG. 2, which stores a list of work schedules that are synchronized with the second system (e.g., payroll system 204 of FIG. 2) independently of the data replication process. After reading the in-sync work schedule object, the method proceeds to 530.

At 530, the list of work schedules read from the in-sync work schedule object is compared to the work schedule(s) affected by the change. In a first non-limiting example, the change is a change to a normal work schedule assigned to one or more workers of a company, but typically fewer than all workers of the company, such as a change from a work schedule in which 8 hours are worked on each day from Monday-Friday and 0 hours are worked on Saturday and Sunday to a new work schedule in which 8 hours are worked on each day from Monday-Thursday and 0 hours are worked on Friday, Saturday, and Sunday. In this example, the comparison can determine whether the normal work schedule assigned to the worker(s) included in the list of work schedules read from the in-sync work schedule object. In a second non-limiting example, the change is a change to a holiday calendar of a certain country, such as the addition of a new holiday (or alternatively, the institution of an entirely new holiday calendar, such as for a holiday calendar for a new year). If the company utilizing the HR system has 3000 workers in that country, the change will affect the work schedules of all of those workers. Accordingly, the comparison can determine which, if any, of the work schedules of those 3000 workers are included in the list of in-sync work schedules read from the in-sync work schedule object. It will be appreciated that each work schedules in the list of in-sync work schedules can be assigned to multiple workers: e.g., 35 workers of a company could be assigned to an in-sync work schedule labeled "NORM1", 80 other workers of the company could be assigned to an in-sync work schedule labeled "NORM2," 18 other workers of the company could be assigned to an in-sync work scheduled labeled "NORM3", etc. However, in other examples, one or more of the work schedules in the list of in-sync work schedules could each be assigned to a single worker.

At 540, only changes to work schedules affected by the change that are not included in the list of in-sync work schedules are replicated. Considering the first example described above, if work schedule of the single worker whose work schedule is changing is not included in the list of in-sync work schedules, it will be determined at 540 that the change should be replicated. In contrast, if the work schedule of that work schedule is included in the list of in-sync work schedules, it will be determined at 540 that the change should not be replicated, as the change will instead be propagated to the second system (e.g., payroll system) via a separate synchronization process. Considering the second example described above, it may be determined that fewer than all (e.g., 1000) of the 3000 workers have work schedules included in the list of in-sync work schedules. In this case, the change to the holiday calendar will not be replicated for the 1000 workers whose work schedules are included in the list of in-sync work schedules, but will be replicated for the remaining 2000 workers whose work schedules are not included in the list of in-sync work schedules.

When replication of a change is performed at 540, this can include performance of a sequence of actions by the first and second systems. For example, with reference to FIG. 2, replication can involve some or all of the actions described for stages 4-14, depending on whether the list of in-sync work schedules is read before or after creation of the data replication proxy.

Otherwise, if the answer at 510 is YES, indicating that the change is a temporary change, the method proceeds to 550. At 550, the change is replicated to all work schedules affected by the change, regardless of whether the work schedules are included in the list of in-sync work schedules. For example, the synchronization of the work schedules on the list of in-sync work schedules between the first system and second system may be limited to non-temporary changes which are relatively global, such as changes to work schedules themselves or changes to holiday calendars. Accordingly, if the change is determined to be (or designated as) a temporary change, it may not be necessary to read the in-sync work schedule object at all; as temporary changes, by default, are not separately synchronized between the first and second systems, it may be appropriate to replicate the temporary changes in order to propagate them from the first system to the second system.

Figure 6:
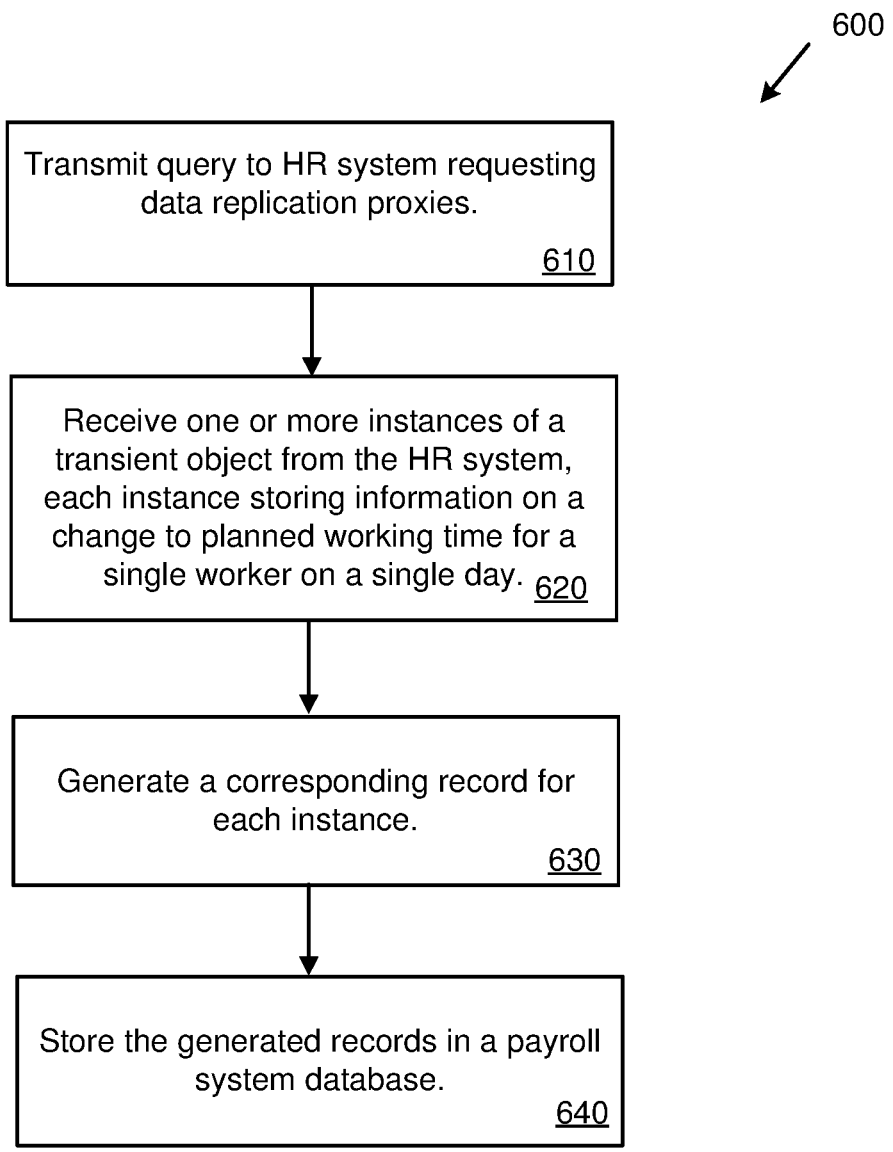
FIG. 6 is a flowchart of an example method performed by a second system for obtaining and replicating changes to planned working time from a first system.

FIG. 6 is a flowchart of an example method 600 performed by a payroll system for obtaining and replicating changes to planned working time from an HR system. Method 600 can be performed by one or more computing devices. For example, method 600 can be performed by one or more computing devices of a payroll system such as payroll system 204 of FIG. 2. Method 600 can be performed at intermittently, as discussed further below.

At 610, a query requesting any new data replication proxies is transmitted from the payroll system to the HR system. As discussed above with respect to stage 5 of FIG. 2, transmission of the query can occur at predetermined intervals; e.g., the payroll system can periodically poll the HR system for new changes to replicate by sending the query. In some examples, however, transmission of the query can occur on an interrupt basis; for example, creation or updating of a data replication proxy at the HR system can generate an interrupt which triggers the HR system to alert the payroll system of a new data replication proxies. In other examples, transmission of a query does not occur at all; instead, the HR system takes the initiative in ensuring that changes meeting the various criteria described herein are transmitted to the payroll system for replication.

At 620, one or more instances of a transient object are received from the HR system, each instance comprising information on a change to planned working time for a single worker on a single day.

At 630, a corresponding record is generated for each instance of the transient object received at 620. For example, the record(s) can be generated by a time inbound web service of the payroll system, as discussed above with reference to stage 12 of FIG. 2.

At 640, the record(s) generated at 630 are stored in a database of the payroll system (e.g., database 116 of FIG. 1). In some examples, the records are stored in a format referred to as infotype 2003.

Computing Systems

Figure 7:
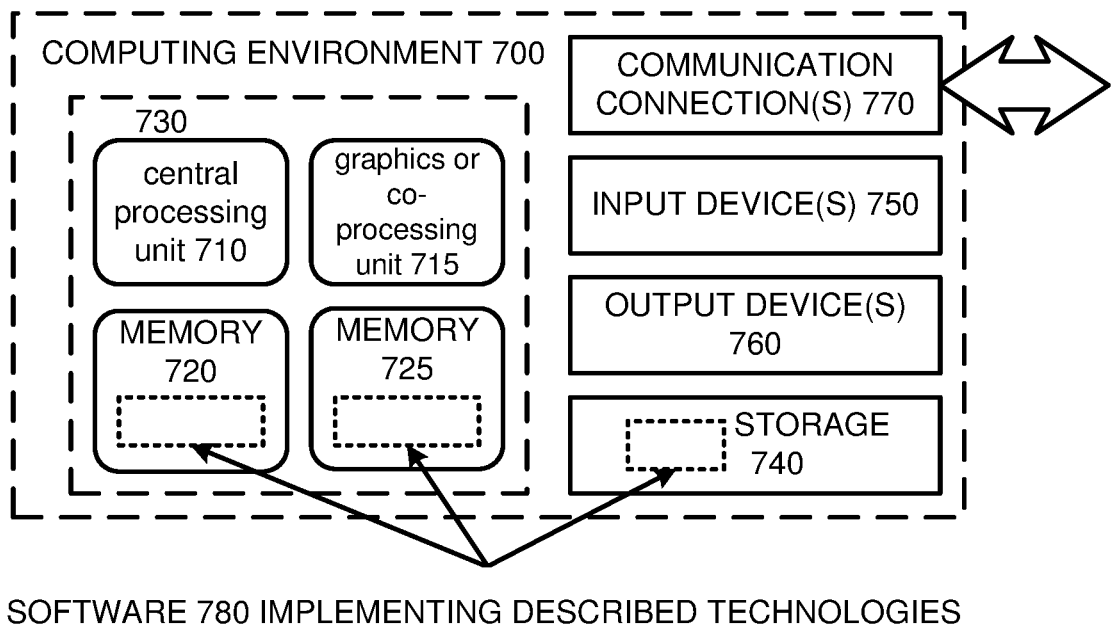
FIG. 7 is a diagram of an example computing system in which some described embodiments can be implemented.

FIG. 7 depicts a generalized example of a suitable computing system 700 in which the described innovations may be implemented. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 8:
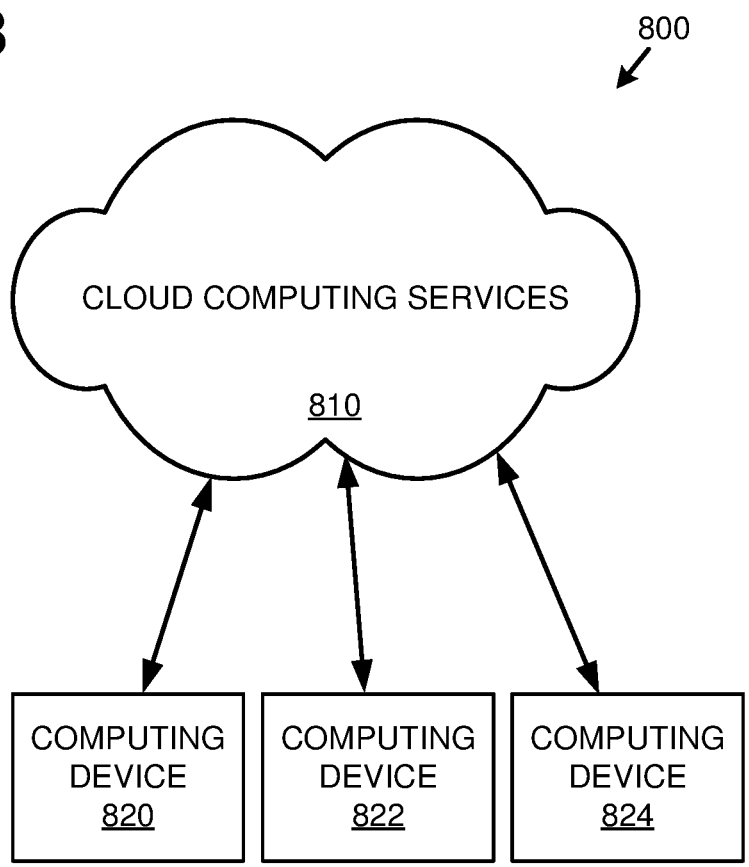
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, database resources, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 7, computer-readable storage media include memory 720 and 725, and storage 740. The term computer-readable storage media does not include signals and carrier waves. In addition, the term computer-readable storage media does not include communication connections, such as 770.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

We claim:

1. A method, performed by one or more computing devices of a first system, for replicating selected changes to planned working time to a second system, the method comprising:
    receiving an indication of a change to a planned working time for one or more workers on one or more days;
    reading a data replication configuration object;
    reading a data replication period object;
    reading an in-sync work schedule object, the in-sync work schedule object storing a list of work schedules;
    determining that a work schedule of at least one of the one or more workers is not included in the list;
    based on information read from the data replication configuration object and the data replication period object and on the determination that a work schedule of at least one of the one or more workers is not included in the list, determining that the change should be replicated to the second system;
    creating or updating a data replication proxy object based on the change;
    invoking one or more instances of a transient object associated with the data replication proxy object, the one or more instances of the transient object comprising information on the change; and
    transmitting the one or more instances of the transient object to the second system.

2. The method of claim 1, wherein the change comprises: a change to a second work schedule of the one or more workers; a temporary change to the second work schedule of the one or more workers; a change associated with a holiday calendar; or a change to a data replication period.

3. The method of claim 2, wherein each of the one or more instances of the transient object defines a scheduled work duration of a single worker on a single day within the data replication period.

4. The method of claim 1,
    wherein the work schedules in the list are independently synchronized between the first and second systems.

5. The method of claim 4,
    wherein invoking the one or more instances of the transient object comprises:
        when the change is not a temporary change to a third work schedule of the one or more workers, only invoking instances of the transient object for workers whose work schedules are not included in the list; and
        when the change is a temporary change to the third work schedule of the one or more workers, invoking instances of the transient object for each of the one or more workers regardless of whether their work schedule is in the list.

6. The method of claim 4, further comprising:
    wherein the reading of the in-sync work schedule object is performed after the data replication proxy object based on the change is created or updated.

7. The method of claim 1,
    wherein the information read from the data replication period object comprises a period of time for which changes should be replicated, and
    wherein determining that the change should be replicated to the second system based on the information read from the data replication period object comprises determining that the change comprises a change to planned working time on at least one day that falls within the period of time for which changes should be replicated.

8. The method of claim 1, wherein the data replication proxy object comprises a field indicating a start date of the change and a field indicating an end date of the change.

9. One or more computing devices comprising:
    processors; and
    memory;
    the one or more computing devices configured, via computer-executable instructions, to perform operations for replicating temporary changes to planned working time from a first system to a second system, the operations comprising:
    at the first system:
    storing a start date and an end date of a data replication period, wherein the start date is different from the end date;
    receiving an indication of a temporary change to a planned working time for one or more workers on one or more days;
    determining whether the temporary change affects any dates within the data replication period;
    when the temporary change to the planned working time affects at least one date within the data replication period, creating or updating a data replication proxy object for the temporary change; and
    using the data replication proxy object to transmit information on the temporary change to the second system.

10. The one or more computing devices of claim 9, the operations further comprising:
    at the second system:
        responsive to receiving the information on the temporary change, generating one or more records reflecting the temporary change, each record storing a work duration for a single worker on a single day.

11. The one or more computing devices of claim 9, the operations further comprising:
    at the first system:
        when the temporary change does not affect at least one date within the data replication period, and instead affects at least one date that falls after the end date of the data replication period, waiting until the data replication period is updated to a new data replication period including at least one date affected by the temporary change, and then creating or updating the data replication proxy object.

12. The one or more computing devices of claim 9, wherein using the data replication proxy object to transmit information on the temporary change to the second system comprises:
    invoking one or more instances of a transient object associated with the data replication proxy object, the one or more instances of the transient object comprising information on the temporary change; and
    transmitting the one or more instances of the transient object to the second system.

13. The one or more computing devices of claim 9, wherein the first system is a Human Resources (HR) system, and wherein the second system is a payroll system.

14. One or more computer-readable storage media storing computer-executable instructions for execution on one or more computing devices to perform operations for replicating changes to planned working time from a Human Resources (HR) system to a payroll system, the operations comprising:
- at the HR system:
  - receiving an indication of a change to a planned working time for one or more workers on one or more days;
  - reading a data replication configuration object;
  - reading a data replication period object;
  - based on information read from the data replication configuration object and the data replication period object, determining that the change should be replicated to the payroll system;
  - creating or updating a data replication proxy object based on the change;
  - receiving a query from the payroll system requesting replication of changes;
  - responsive to the query, invoking one or more instances of a transient object associated with the data replication proxy object, the one or more instances of the transient object comprising information on the change;
  - transmitting the one or more instances of the transient object to the payroll system; and
- at the payroll system:
  - responsive to receiving the one or more instances of the transient object, generating a corresponding record for each instance and storing the record(s) in a database of the payroll system.

15. The one or more computer-readable storage media of claim 14, wherein work schedules of a plurality of workers are stored at the HR system, and wherein work schedules of fewer than all of the plurality of workers are synchronized with and stored at the payroll system.

16. The one or more computer-readable storage media of claim 15, the operations further comprising:
- at the HR system:
  - reading an in-sync work schedule object, the in-sync work schedule object storing a list of work schedules that are synchronized with and stored at the payroll system.

17. The one or more computer-readable storage media of claim 16, wherein the determination that the change should be replicated to the payroll system is further based on a determination that at least one work schedule affected by the change is not included in the list.

18. The one or more computer-readable storage media of claim 16,
wherein invoking the one or more instances of the transient object comprises:
- when the change is not a temporary change to a work schedule of one or more workers, only invoking instances of the transient object for workers whose work schedules are not included in the list; and
- when the change is a temporary change to the work schedule of one or more workers, invoking instances of the transient object for each of the one or more workers regardless of whether their work schedule is included in the list.

19. The one or more computer-readable storage media of claim 15, wherein the change comprises: a change to a work schedule of one or more workers; a temporary change to a work schedule of one or more workers; a change associated with a holiday calendar; or a change to a data replication period.

20. The one or more computer-readable storage media of claim 14, wherein each of the one or more instances of the transient object defines a scheduled work duration of a single worker on a single day within a data replication period defined in the data replication period object.

* * * * *